United States Patent
Jackson

[15] 3,675,431
[45] July 11, 1972

[54] OFF-SHORE STORAGE TANKS

[72] Inventor: Robert G. Jackson, Hornchurch, England

[73] Assignee: Conch International Methane Limited, Nassau, Bahamas

[22] Filed: May 17, 1971

[21] Appl. No.: 143,872

[30] Foreign Application Priority Data

May 26, 1970 Great Britain...................26,035/70

[52] U.S. Cl. ........................61/46, 61/.5, 61/36 A, 61/46.5, 62/45, 220/9 LC, 220/13, 220/18
[51] Int. Cl. ................E02d 29/06, B65g 5/00, F25d 23/00
[58] Field of Search ................6/46, 46.5, .5, 50; 220/9 LG, 220/18, 13; 62/45; 61/36 A

[56] References Cited

UNITED STATES PATENTS

| | | | |
|---|---|---|---|
| 3,416,325 | 12/1968 | Nelson | 220/9 LG X |
| 3,552,131 | 1/1971 | Mott et al. | 61/46 |
| 3,563,041 | 2/1971 | Michel | 61/46 |
| 3,581,513 | 6/1971 | Cranmer, Jr. | 61/36 A X |
| 3,595,423 | 7/1971 | Yamamoto | 220/9 LG X |

FOREIGN PATENTS OR APPLICATIONS

| | | | |
|---|---|---|---|
| 1,354,693 | 1/1964 | France | 220/9 LG |

*Primary Examiner*—Jacob Shapiro
*Attorney*—Max L. Libman

[57] ABSTRACT

An off-shore storage tank for liquefied gas has an outer shell, of which at least the lower part, which is immersed in the water, is made of solid concrete, sufficiently thick and heavy when in place to sink in the water even when empty, and is lined with thermal insulation such that in operation, when storing liquefied gas at cryogenic temperatures, the said lower part is maintained at a surface temperature below the freezing point of the water in which it is immersed so that a coating of frozen water is formed on the tank which acts as an additional seal for the concrete. Other features are that the upper part of the tank wall is sufficiently thinner than the lower part to provide an external annular step constituting a walkway around the tank, and the provision of tangential piers as part of the tank structure at points opposite to and adjacent the shore line. The tank is preferably made initially light enough in weight so that it can be floated to its location of use, then further concrete or other loading is added to sink the tank to the sea bed.

4 Claims, 2 Drawing Figures

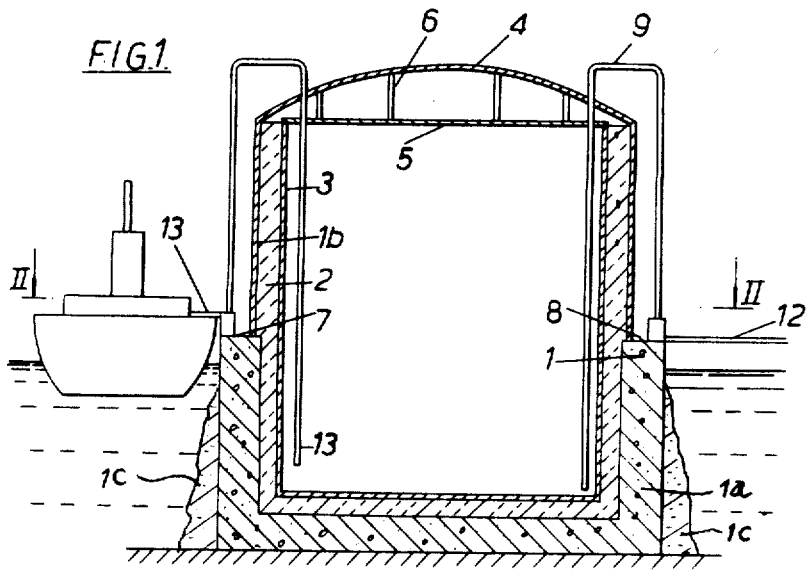
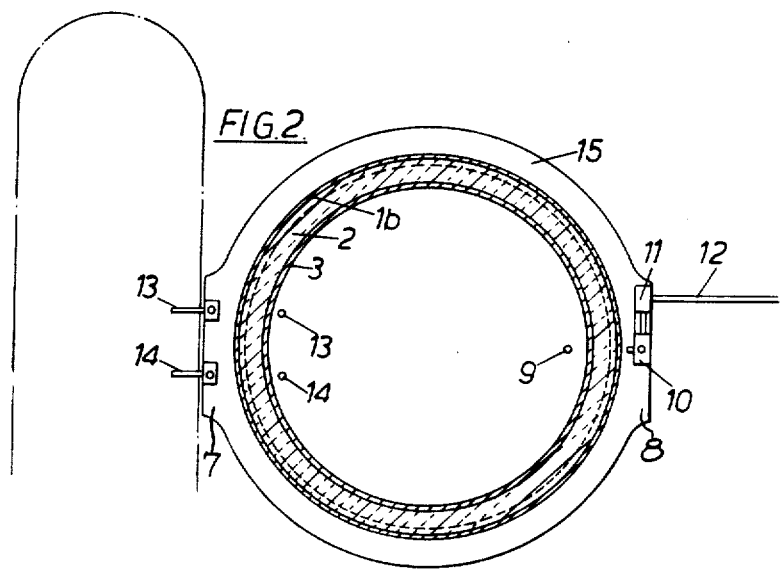

OFF-SHORE STORAGE TANKS

This invention relates to storage containers for liquefied gases particularly liquefied natural gas or methane and liquefied gases such as ethane, propane, butane, ethylene and propylene.

In the specification, the expression "liquefied gas" means liquid which boils at atmospheric pressure at a temperature below the ambient temperature.

According to this invention, a storage container for liquefied gas and adapted for installation off-shore comprises an outer shell at least the lower part of which is of bulk concrete, said outer shell being of sufficient weight to overcome the floation forces of the surrounding water when the tank is empty, thermal insulation within the outer shell at least the lower part of which is of a thickness selected such that in operation the outer surface of said lower part of the outer shell is at a temperature at least as cold as the freezing point of the surrounding water whereby the frozen water will act as a seal for the concrete.

The thermal insulation may itself be liquid-tight. Alternatively, a liquid-tight lining may be provided within the thermal insulation. The liquid-tight lining may be self-supporting, i.e. have sufficient rigidity to support its own weight and the weight and inertia forces of the liquid. Alternatively, this lining may be in the form of a thin and flexible membrane of, for example, an iron nickel alloy or stainless steel, wholly supported by the thermal insulation, or a self-standing tank which relies upon the thermal insulation to support the weight and inertia forces of the liquid.

The whole of the outer shell may be entirely of concrete or alternatively the upper part of it may be of metal. In either case conveniently the upper part of said outer shell is thinner than the said lower part and the difference in thickness between these parts provides an external annular step constituting a walkway around the container.

Conveniently the container may include on points opposite to and adjacent to the shore line tangential piers for accommodating a liquefied gas tanker on the sea side and the equipment necessary to regasify and-or pump the liquefied gas from the storate tank to shore on the shore side.

In order that the invention may be readily understood, a storage container adapted for installation off-shore will now be described, by way of example, with reference to the accompanying drawings in which FIG. 1 is a diagrammatic cross-sectional elevation of the storage container; and FIG. 2 is a view taken on the line II—II of FIG. 1.

Referring to the drawings, the storage container comprises essentially an outer shell 1, thermal insulation 2 within the outer shell and a liquid-tight lining 3 within the thermal insulation. In this embodiment the liquid-tight lining is in the form of a thin and flexible membrane. The lower part 1a, i.e. that part of the container which extends from the sea bed to at least the normal high-tide level is of bulk concrete of sufficient weight that it overcomes the flotation forces of the surrounding sea. This part 1a may initially be of insufficient weight to overcome the flotation forces so that it may be floated to its location at which time further concrete is added to sink this part to the sea bed. The upper part 1b of this outer shell is of metal and a roof 4 extends over this upper part. A ceiling 5 is suspended from the roof 4 on tie rods 6, the ceiling extending across the mouth of the liquid-tight lining 3. A suitable suspended ceiling is described, for example, in my co-pending U.S. Pat. application, Ser. No. 76,138, filed Sept. 28, 1970. The thermal insulation 2 within the lower part 1a of the outer shell is of a thickness selected such that with the container filled with liquefied gas the outer surface of said lower part of the outer shell is at a temperature below the freezing point of the surrounding sea, whereby a layer of ice forms as shown at 1c to act as a seal for the concrete; the thermal insulation within the upper part 1b of the shell would preferably be thicker to maintain "boil-off" of the liquefied gas at a minimum.

After the tank is sunk and in place, it may, if desired, be tied to piles driven into the sea bed to insure against the possibility of subsequent displacement or shifting.

The lower part 1a of the outer shell is formed with tangential piers 7 and 8 which accommodate a liquefied gas tanker on the sea side and the necessary equipment for pumping the liquefied gas from the storage container to the shore on the shore side respectively. For example, the equipment carried by the pier 8 would include a liquid discharge line 9 extending from the tank, a vaporizer 11 and suitable piping 12 which extends to the shore. The pier 7 would include liquid discharge and vapor return lines 13 and 14 respectively and any necessary auxiliary equipment. The external annular step 15 left between the parts 1a and 1b of the outer shell conveniently provide a walkway between the piers 7 and 8.

The membrane lining 3 supported by the thermal insulation 2 may be of any convenient design, for example, as described in my co-pending U.S. Pat. application, Ser. No. 76,137, filed Sept. 28, 1970.

It will be appreciated that in the transportation of liquefied gases such as natural gas it is normally required to build, as part of a liquefaction plant and part of the reception facilities, a terminal composed of a jetty, storage tank or tanks, pumps, and other auxiliaries associated with the movement of the gas. To do this, large expenditures are required on site purchase and site preparation and to comply with regulations. This can involve a total expenditure many times more than the cost of the storage itself. Additionally, so that large ships may load or discharge the required gases, extensive dredging may be needed or a long jetty. An object of this invention is to eliminate some of this expenditure. Thus, for example, the need for a substantial jetty or extensive dredging may be avoided and, particularly on the reception terminal, only warm gas lines need be projected from the tank to the shore. Additionally, it is unnecessary to purchase land and the spacing between adjacent tanks can be limited to meet solely fire regulations, the necessity for large bounded areas being eliminated by the fact that the containers are surrounded by water.

I claim:

1. A storage container for liquefied gas and adapted for partly-submerged installation off-shore, comprising
   a. an outer shell at least the lower part of which is of bulk concrete, said outer shell being of sufficient weight to overcome the floatation forces of the surrounding water when the tank is empty,
   b. thermal insulation within the outer shell, the lower part of which is of a thickness selected such that in operation the outer surface of said lower part of the outer shell is at a temperature at least as cold as the freezing point of the surrounding water, whereby an outer layer of frozen water is formed which will act as a seal for the concrete.
2. A storage container according to claim 1,
   c. the upper part of said thermal insulation, above the water line being thicker than the lower part so as to maintain "-boil-off" at a minimum.
3. A storage container according to claim 1,
   c. wherein tangential piers are provided on points opposite to and adjacent to the shore-line for accommodating a liquefied gas tanker on the sea side and the equipment necessary to regasify and/or pump the liquefied gas from the storage tank to shore on the shore side.
4. A storage container according to claim 1,
   c. wherein the upper part of said outer shell is thinner than said lower part, and the difference in thickness between these parts provides an external annular step constituting a walkway around the container.

* * * * *